United States Patent
Maruyama et al.

(10) Patent No.: US 6,883,033 B2
(45) Date of Patent: Apr. 19, 2005

(54) SYSTEM AND METHOD FOR REGULATING INCOMING TRAFFIC TO A SERVER FARM

(75) Inventors: Kiyoshi Maruyama, Westchester County, NY (US); Shun Shing Chan, Fresh Meadows, NY (US); Jarir Kamel Chaar, Tarrytown, NY (US); Jean A. Lorrain, Vence (FR); Miram Zohar, New Hempstead, NY (US); David Alson George, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 09/921,989

(22) Filed: Feb. 20, 2001

(65) Prior Publication Data

US 2002/0124103 A1 Sep. 5, 2002

(51) Int. Cl.[7] .............................................. G06F 15/16
(52) U.S. Cl. ....................................................... 709/229
(58) Field of Search ................................. 709/229, 223, 709/238

(56) References Cited

U.S. PATENT DOCUMENTS 6,353,888 B1 * 3/2002 Kakehi et al. ............... 713/168
6,438,551 B1 * 8/2002 Holmskar .................... 707/10
6,442,588 B1 * 8/2002 Clark et al. .................. 709/203

* cited by examiner

*Primary Examiner*—David Y. Eng
(74) *Attorney, Agent, or Firm*—Wan Yee Cheung; Gary M. Hartman; Domenica N. S. Hartman (57) ABSTRACT

A system and method for controlling the rates at which application workload, e.g., TCP connection requests, is admitted to a collection of servers, such as a server farm of an application service provider (ASP) that hosts Internet World Wide Web (WWW) sites of various owners. The system and method are intended to operate in an environment in which each customer has a workload-based SLA for each type of application hosted by the provider and used by the customer. The system and method achieve support (minimum, maximum) TCP connection requests for multiple customers and applications. According to one aspect, the system and method guarantee, control and deliver TCP connection-based workload SLA's to customers whose applications are hosted by the server farm with the use of a workload regulator that operates by regulating only new TCP connection request packets while transparently passing existing TCP connection packets and other request packets received for customers. The regulator further operates by regulating the flow of incoming TCP connection requests to each customer business activity application so as to guarantee a level of service previously agreed to each customer (per their respective SLA's) by applying rate admittance to requests and by dropping (or rejecting) requests to guarantee the agreed service levels to the customer's application.

40 Claims, 5 Drawing Sheets

Web Workload Regulator (WWR)

FIG. 1

REAL-TIME GATEKEEPER

REPEAT:

(STEP 1) --If the cycle-time has expired, /* then getting ready for the next cycle by re-setting variables */
then do; C = C + 1;
    Get Nunused (j) from WWR Assistant;
    set Cadmitted(i,j) = Cadmitted(i,j) + Nadmitted(i,j) for all (i,j);
    set Crejected(i,j) = Crejected(i,j) + Nrejected(i,j) for all (i,j);
    set Nadmitted(i,j) = 0 for all (i,j); set Nrejected(i,j) = 0 for all (i,j);
    set Nsharable(j) = Nexcess(j) + Nunused(j) for all (j);
end;

(STEP 2) --Get a packet;
If the packet's SYN bit is OFF
then do: let the packet pass through; go to REPEAT; end;
/* handling TCP connection request */
Find its index (i,j);

(STEP 3) --If Nadmitted(i,j) < Nmin(i,j) /* guaranteeing the minimum SLA*/
then do: set Nadmitted(i,j) = Nadmitted(i,j) + 1;
    let the packet pass through;
    go to REPEAT;
end;

(STEP 4) --If (Nadmitted(i,j) ≥ Nmin(i,j) & (Nadmitted(i,j) < Nmax(i,j)) & (Nsharable(j) > 0)
/* the request can be admitted */
then do; set Nadmitted(i,j) = Nadmitted(i,j) + 1; Set Nsharable(j) = Nsharable(j) – 1;
    let the packet pass through;
    go to REPEAT;
end;
/* the request should be rejected */
else do; set Nrejected(i,j) = Nrejected(i,j) + 1;
    forward the packet to WWR Guide;
    go to REPEAT;
end;

FIG. 2

ASSISTANT FOR REAL-TIME GATEKEEPER set Nunused(j) = 0 for all (j);
If the mode of operation is "not borrowing" then return;
/* now the mode of operation is "borrowing", and thus need to compute Nunused(j) for all j */
For every (j) and for every (i),
    If Nadmitted(i,j) < Nmin(i,j) then set Nunused(j) = Nunused(j) + (Nmin(i,j) – Nadmitted(i,j));
For every (j), Nunused(j) = Nunused(j) * Unused_Permit_Factor(j);
return;

FIG. 3

TARGET-RATE BASED GATEKEEPER

/* Rate based Gatekeeper algorithm */
REPEAT:

(STEP 1) --- If the cycle-time has expired, /* then getting ready for the next cycle by re-setting variables */
then do; C = C + 1;
    set Cadmitted(i,j) = Cadmitted(i,j) + Nadmitted(i,j) for all (i,j);
    set Crejected(i,j) = Crejected(i,j) + Nrejected(i,j) for all (i,j);
    set Nadmitted(i,j) = 0 for all (i,j); set Nrejected(i,j) = 0 for all (i,j);
end;

(STEP 2) ---Get a packet;
If the packet's SYN bit is OFF
then do: let the packet pass through; go to REPEAT; end;
/* handling TCP connection request */

(STEP 3) ---Find its index (i,j);
If Nadmitted(i,j) < Ntarget(i,j)
/* accepting the request */
then do; set Nadmitted(i,j) = Nadmitted(i,j) + 1;
    let the packet pass through;
    go to REPEAT;
end;
/* rejecting the request */
else do;   set Nrejected(i,j) = Nrejected(i,j) + 1;
    forward the packet to WWR Guide;
    go to REPEAT;
end;

FIG. 4

ASSISTANT FOR TARGET-RATE-BASED GATEKEEPER (STEP 1) --- /* compute Ntarget(i,j) */
Do the following for every application class j;
If ((Nrejected(i,j) = 0)    /* no request rejection occured */
& (Nadmitted(i,j) <= Nmax(i,j)) over all i    /* no SLA violation detected, here <= means less than or equal to. */
then go to STOP;
COMPUTE_TARGETS:

(STEP 2) --- Let Ntarget(i,j) = Nadmitted(i,j) + Nrejected (i,j) for all i;
Compute Ntotal(j); /* Ntotal(j) here is the sum of Ntarget(i,j) over all i */
For every (i,j) such that Ntarget(i,j) > Nmax(i,j)    /* demand is exceeding the maximum */
first set Ntotal(j) = Ntotal(j) − (Ntarget(i,j) − Nmax(i,j));    /* adjusting the total demand */
And then set Ntarget(i,j) = Nmax(i,j);    /* not allowing the demand to exceed the maximum */
If Ntotal(j) <= Nlimit(i,j) then go to STOP;
/* each Ntarget(i,j) needs to be set below Nmax(i,j) */

(STEP 3) --- Let Nexceeded(j) be the sum of (Ntarget(i,j) − Nmin(i,j)) over those i such that Ntarget(i,j) > Nmin(i,j);
If the-mode-of-operation is "non borrowing" then set Nsharable(J) = Nexcess(j);
If the-mode-of-operation is "borrowing" then compute Nunused(j) and set Nsharable(j) = Nexcess(j) +
Nunused(j) * Unused_Permit_Factor(j);
/* What performed next is fair allocation. However, priority based allocation can be performed instead */
For every i such that Ntarget(i,j) > Nmin(i,j)
Set Ntarget(i,j) = Nmin(i,j) + (Ntarget(i,j) − Nmin(i,j)) * (Nsharable(j) / Nexceeded(j));
else set Ntarget(i,j) = Nmax(i,j);

(STEP 4) --- STOP:
End;

FIG. 5

SYSTEM AND METHOD FOR REGULATING INCOMING TRAFFIC TO A SERVER FARM

BACKGROUND OF THE INVENTION

1. Field of the Invention

The present invention relates generally to world-wide networks, and more particularly to the global Internet and Internet World Wide Web (WWW) sites of various owners that are hosted by a service provider using a cluster of servers that are intended to meet established service levels.

2. Description of the Prior Art

The Internet is the world's largest network, and it has become essential to academia and many small, medium and large businesses, as well as to individual consumers. Many businesses have started outsourcing their application (business and commerce) processing to service providers instead of running and maintaining application software on their own server(s). These service providers are known as Application Service Providers (ASP). Each ASP installs a collection of servers (termed a server farm) which can be used to run many different business applications for various customers. These customers (i.e., the service provider's "customers" who are often called "hosted" customers) have different "workload" requirements for their applications. The ASP's must ensure that their server farms can handle the various workload requirements of their hosted customers' applications.

When businesses out-source their business applications to a service provide, they typically obtain a guarantee on the services they will receive from the service provider for their applications. Once the service provider makes a commitment to a customer to provide a certain "level" of service (e.g., a Service Level Agreement (SLA)), the provider must guarantee that level of service to that customer. The incoming traffic (e.g., Internet Protocol (IP) packets) from the service provider's customers to a server farm can be classified into various classes/types by examining the packet destination address and the Transmission Control Protocol (TCP) port number. A general SLA on an application workload to a server farm can be denoted by a pair of TCP connection rates: the minimum TCP connection rate Nmin(i,j) and the maximum TCP connection rate Nmax(i,j) for the $i^{th}$ customer's $j^{th}$ application. The minimum (or min) TCP connection rate Nmin(i,j) is a guaranteed TCP connection rate that the $i^{th}$ customer's $j^{th}$ application will be supported by the server farm regardless of the server farm's usage by other customers' applications. In other words, the service provider guarantees that TCP connection requests associated with a given customer for a given application will be admitted to the server farm as long as Nmin(i,j) is not exceeded. The maximum (or max) TCP connection rate Nmax(i,j) is an upper bound on the TCP connection rate that the $i^{th}$ customer's $j^{th}$ application may be supported by the server farm provided that some additional "sharable capacity" allocated for handling the $j^{th}$ application is available. Such sharable capacity may be available because some "excess" capacity has been allocated for the $j^{th}$ application by the server farm operator and/or because some "unused capacity" is available due to some customer's $j^{th}$ applications are not using their allocated minimum TCP connection capacities. Therefore, the range between Nmin(i,j) and Nmax(i,j) represents the TCP connections that are supported on "best-effort" basis, and it is not necessarily guaranteed that a customer's TCP connection request will be admitted beyond the guaranteed minimum Nmin(i,j). Generally, the unit cost charged per TCP connection beyond the minimum Nmin(i,j) is more than the unit cost charged per TCP connection below Nmin(i,j). Such a unit cost assigned to one customer may differ from those assigned to other customers.

Some commercial products (e.g., the Access Point (AP) products from Lucent/Xedia (www.xedia.com), and the Speed-Class products from PhaseCom (www.speed-demon.com)) can be used to "shape" the inbound traffic (admitted bits per second into a server farm) to meet the (minimum, maximum) bandwidth usage-based SLA for each customer and for each customer's application. Unfortunately, however, the amount of bits coming into the server farm does not necessarily represent the workload requirements as represented by the number of TCP connection requests. U.S. patent application Ser. Nos. 09/506,603 and 09/543,207, commonly assigned with the present invention, teach systems and methods for meeting outbound bandwidth usage-based SLA's by regulating inbound traffic to a server farm. However, their systems do not address the problem of how to support (Nmin(i,j),Nmax(i,j)) TCP connection request-based SLA's.

Accordingly, what is need is a system and method for meeting SLA's for application workloads to a server farm based on TCP connection requests, as opposed to meeting SLA's based on the number of bits coming into the server farm.

BRIEF SUMMARY OF THE INVENTION

The present invention provides a system and method for controlling the rates at which application workload (TCP connection requests) is admitted to a collection of servers, such as a server farm of an application service provider (ASP) that hosts Internet World Wide Web (WWW) sites of various owners. The system and method of this invention are intended to operate in an environment in which each customer has a workload-based SLA for each type of application hosted by the provider and used by the customer. The system and method of the present invention achieve this aspect of the invention by supporting (minimum, maximum) TCP connection requests for multiple customers and applications. The system of the present invention can have a modular design for maximizing performance and operation flexibility, while also providing real-time workload handling to minimize the packet processing delay.

According to a first aspect of the present invention, the system and method guarantee, control and deliver TCP connection-based workload SLA's to customers whose applications are hosted by a collection of servers, e.g., a server farm, operated by a service provider. The system and method of the present invention entail the use of a workload regulator that operates by regulating only new TCP connection request packets while transparently passing other IP packets (e.g., packets associated with existing TCP connections). The regulator further operates by regulating the flow of incoming TCP connection requests to each customer business activity application so as to guarantee a level of service previously agreed to each customer (per their respective SLA's) by applying rate admittance to requests and by dropping (or rejecting) requests to guarantee the agreed service levels to the customer's application. The SLA's are preferably in the form of (minimum, maximum) TCP connection request rates, where the minimum TCP connection request rate represents the guaranteed rate at which TCP connection requests will be admitted, while the maximum TCP connection request rate represents the upper bound to the rate at which TCP connection requests could be admitted if the server farm has unused resources available to process related applications.

According to a preferred aspect of the invention, each and every incoming IP packet is put into a common buffer for FIFO (first in, first out) processing. The system takes a packet from the common buffer, determines the associated customer and application that the packet belongs to, and then processes requests for new TCP connections using a real-time regulation (or gatekeeping) algorithm that supports and enforces the (minimum, maximum) TCP connection request workload-based SLA to each customer application. The regulation algorithm may look for an opportunity to increase the revenue to a server farm operator when admitting TCP connection requests, especially beyond the minimum SLA's.

With the system and method provided by the present invention, (minimum, maximum) TCP connection request workload-based SLA's are guaranteed and delivered to applications that are serviced by an APS. Any single customer's application workload is prevented from monopolizing an entire application processing capacity allocated by an APS to that type of application for all customers. Along these lines, the total workload coming into the server farm is maximized and yet fair admittance of workload is provided to various customers. Other features and benefits made possible with the present invention include the ability to provide differentiated services to a plurality of different applications, and to provide security measures for preventing any wrongful user or users trying to crash customer web sites or the server farm by generating extremely high volume of TCP connection requests. The method and system of this invention can be made "stateless" (i.e., not keeping track of individual TCP connections), and may be controlled by an external means while also being capable of operating without receiving any periodic control signals. The method and system of the present invention can also allow "borrowing" and "non-borrowing" of unused TCP connection workload by those that require more TCP connections than their agreed upon minimums. Still another aspect of the present invention is the ability to provide a system that, when a TCP connection request must be rejected, a choice is offered to simply drop or return a TCP connection "reset" packet to the TCP initiator.

Other objects and advantages of this invention will be better appreciated from the following detailed description.

DETAILED DESCRIPTION OF THE INVENTION

Figure 1:
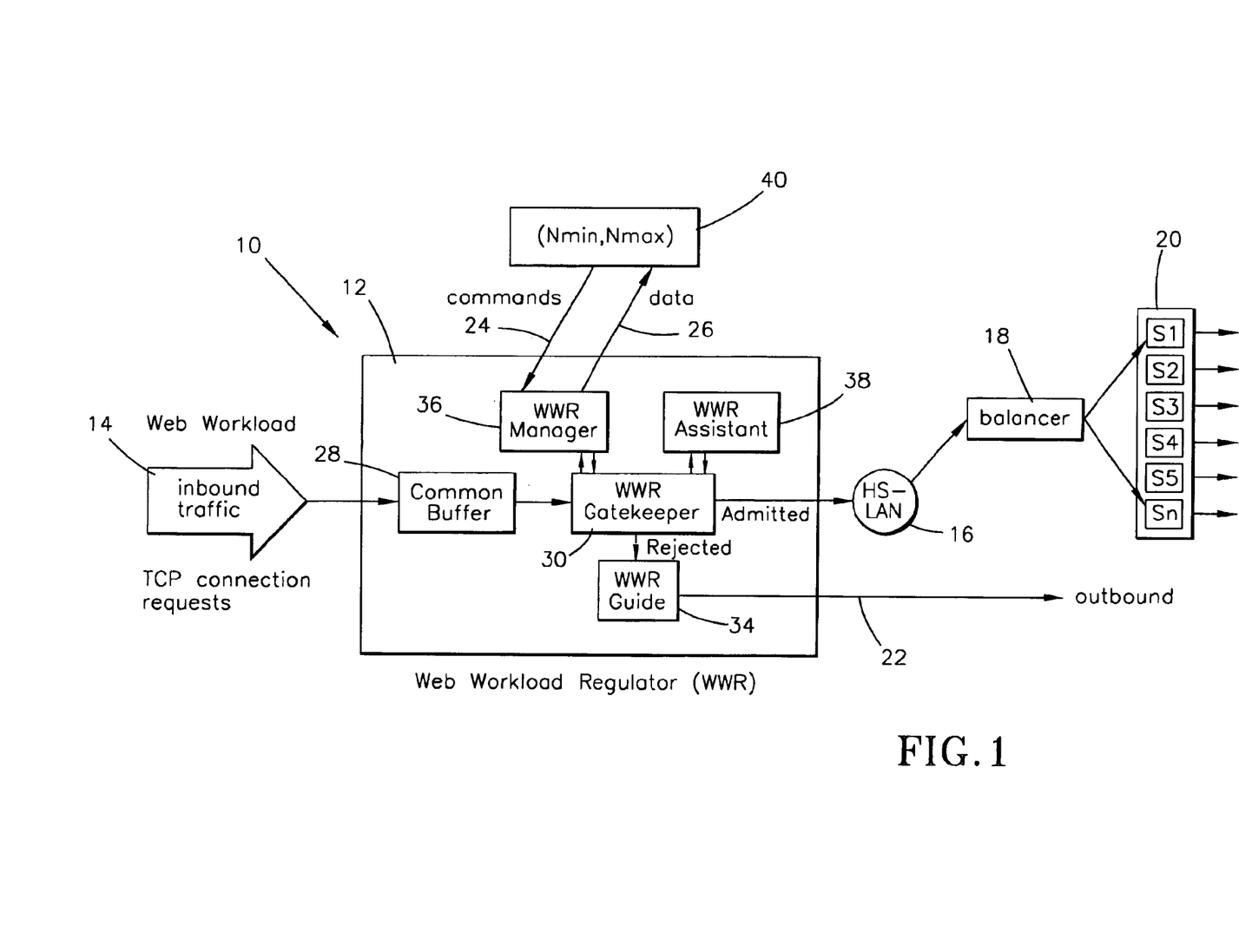
FIG. 1 represents a system environment and a workload regulator operating therein for controlling and managing Internet server farm traffic in accordance with the present invention.

FIG. 1 schematically represents a system environment 10 in which traffic through an Internet server farm 20 can be regulated with a workload regulator 12, termed a Web Workload Regulator or WWR, in accordance with the present invention. In FIG. 1, inbound traffic (web workload) 14 representing IP packets (comprising existing TCP connections and TCP connection requests) for all customers' applications enter the WWR 12. The WWR 12 regulates the flow of TCP connection request packets while transparently passing (admitting) other IP packets (e.g., packets associated with existing TCP connections and packets for non-TCP connections). Admitted traffic, which will also include admitted TCP connection request packets (in a manner described below), are sent to a workload balancer 18 via a high-speed LAN (HS-LAN) 16. Any rejected TCP connection request packets are processed by a WWR guide 34, which sends the rejected packets to an outbound link 22. The outbound link 22 may also go through the HS-LAN 16 or another high-speed LAN. The balancer 18 can be any existing workload dispatching product, such as a Secure way Network Dispatcher commercially available from International Business Machines Corporation (www.ibm.com), or LocalDirector commercially available from Cisco Systems (www.cisco.com). The balancer 18 is responsible for "spraying" the received and admitted workload to a number of servers (S1, S2, . . . Sn) of the server farm 20.

The WWR 12 includes five components: a common buffer 28, a gatekeeper 30, the guide 34, a manager 36, and an assistant 38. The inbound traffic (web workload) 14 is first stored in the common buffer 28, the size of which is preferably large enough to absorb a surge of inbound traffic 14 when the gatekeeper 30 processes the received TCP connection requests in the buffer 28. The gatekeeper 30 makes the decision as to whether a received TCP connection request for a particular customer's application should be admitted or rejected (dropped) in view of the customer's SLA. If the gatekeeper 30 has decided to admit a request, the request is transmitted over the HS-LAN 16 to the balancer 18. If the gatekeeper 30 decides to reject a request, the request is handed over to the guide 34, which handles the rejected request. The guide 34 has two options in handling a rejected TCP connection request. The first is to simply drop the request, while the second is to return the rejected TCP packets with the RST (reset) code bit "ON" to the TCP connection initiators (not shown) via the outbound link 22.

The assistant 38 assists the gatekeeper 30 by computing the amount of "sharable" TCP connections the gatekeeper 30 can use. This offloading of the computation of "sharable" TCP connections from the gatekeeper 30 to the assistant 38 makes the gatekeeper 30 more highly efficient and scalable. However, it is foreseeable that the gatekeeper 30 could compute the amount of "sharable" TCP connections, eliminating the need for the assistant 38.

As shown in FIG. 1, the WWR 12 is preferably capable of receiving (minimum, maximum) TCP connection workload-based SLA commands 24, and capable of providing workload statistic data 26 to a suitable external means 40 for processing and accounting. The manager 36 performs this function for the WWR 12 by receiving the SLA commands 24 when they have changed, and sends the collected workload statistic data 26 to the external processing and accounting means 40.

The following table lists the definitions of variables that will be used in illustrating algorithms used in the gatekeeper 30, guide 34 and assistant 38.

| SYMBOL | DESCRIPTION |
|---|---|
| Nlimit(j) | The total number of TCP connections per second that the server farm 20 can accept for the $j^{th}$ application. |
| Nmin(i,j) | The guaranteed number of TCP connections per second to the $i^{th}$ customer's $j^{th}$ application. |
| Nmax(i,j) | The bound on the best-effort support beyond Nmin(i,j). |
| Nadmitted(i,j) | The number of TCP connections per second that were admitted to the server farm 20 for the $i^{th}$ customer's $j^{th}$ application. |
| Ntotal(j) | The sum of Nadmitted(i,j) over all customers i. |
| Nmin(j) | The sum of Nmin(i,j) over all customers i. |
| Nexcess(j) | The server farm's excess capacity, Nexcess(j) = Nlimit(j) − Nmin(j). |
| Nunused(j) | The "borrowable" amount; the sum of [Nmin(i,j) − Nadmitted(i,j)] such that Nmin(i,j) > Nadmitted(i,j) over all customers i. |
| Nsharable(j) | The TCP connection that can be shared by those who are exceeding Nmin(i,j); Nsharable(j) = Nexcess(j) + Nunused(j). |
| Ntarget(i,j) | The targeted rate on the number of TCP connections per second for (i,j). |

NOTE:
"Number of active connections" can be substituted for "connections per second" if the gatekeeper 30 keeps TCP connection status information.

Figure 2:
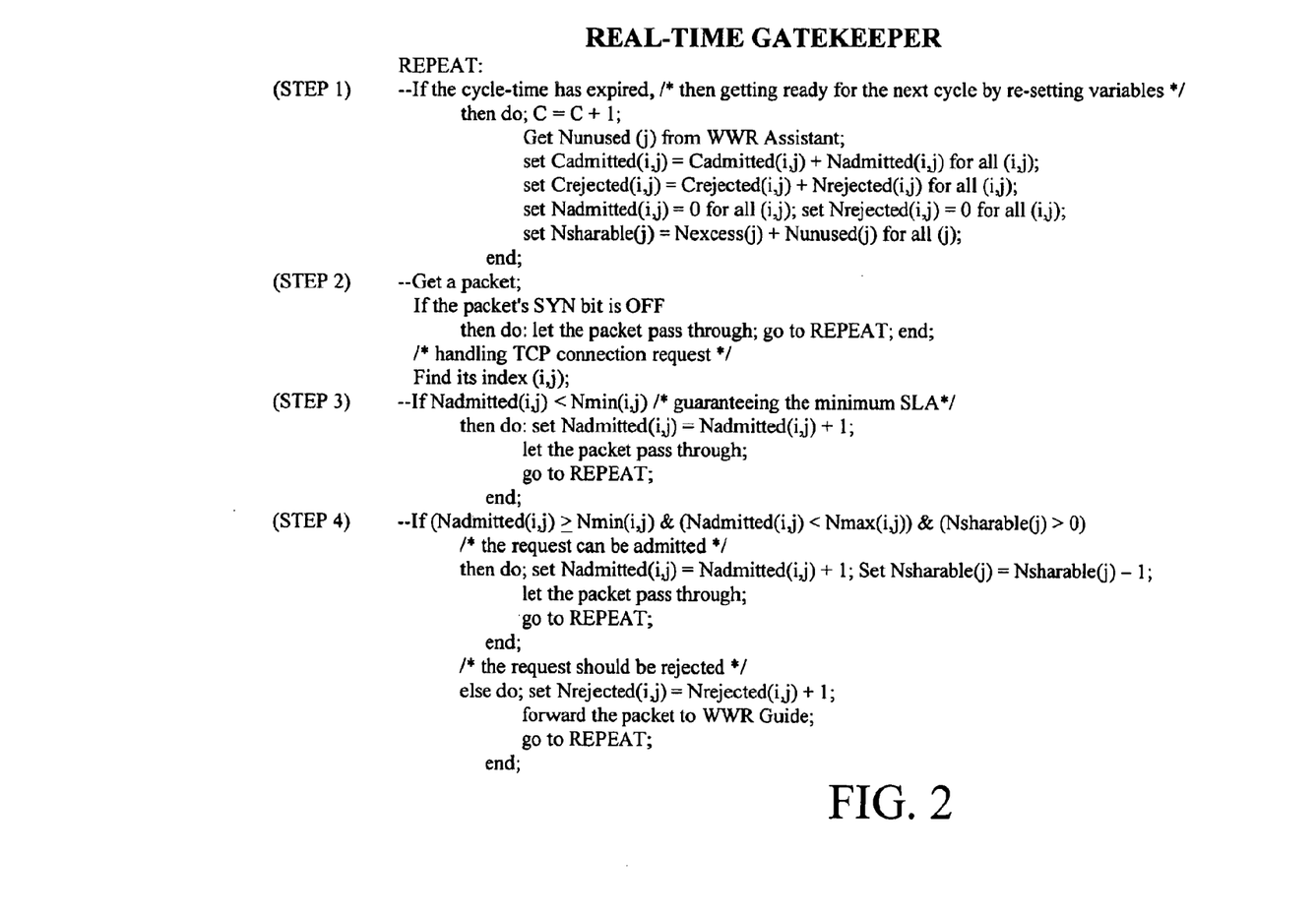
FIG. 2 illustrates a real-time algorithm used in a gatekeeper associated with the workload regulator of FIG. 1.
Figure 3:
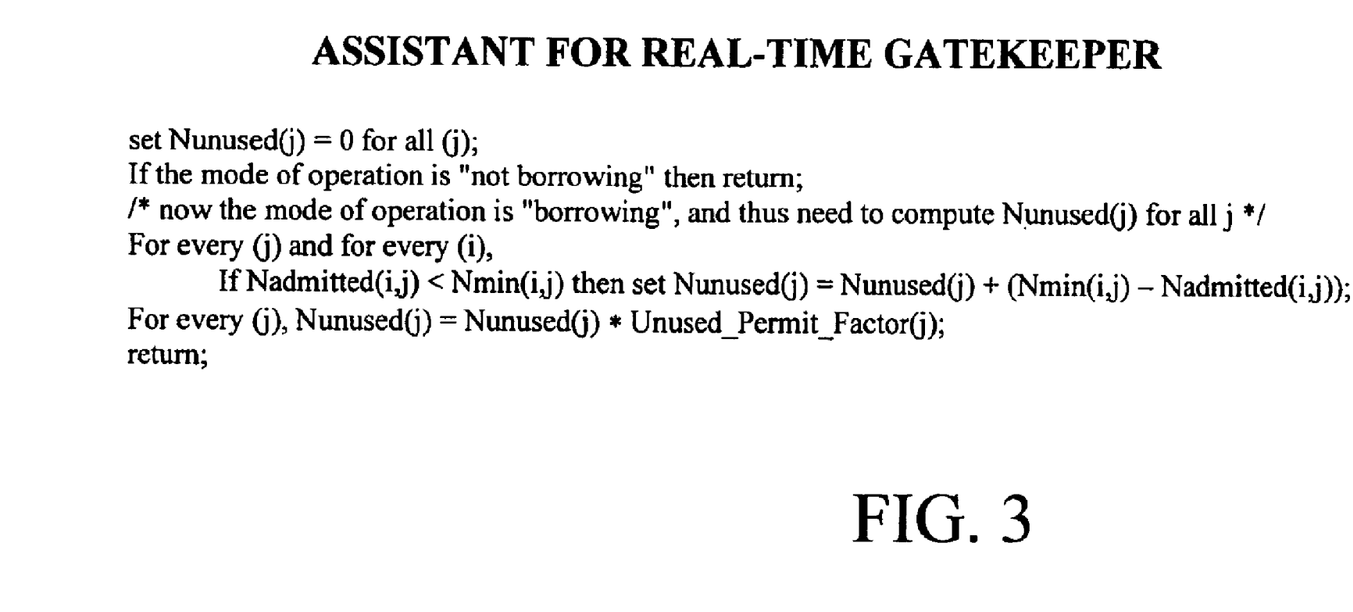
FIG. 3 illustrates an algorithm used in an assistant that operates in conjunction with the real-time gatekeeper algorithm of FIG. 2.

FIG. 2 illustrates a real-time algorithm that is suitable for use in the gatekeeper 30. Steps 1 through 4 of the algorithm are carried out for every packet received in the common buffer 28. In Step 1, a time interval, referred to as cycle-time, is checked to see if it has expired. If not expired, the algorithm proceeds to Step 2; if expired, Step 1 resets the control variables, increments the cycle counter "C" by one, gets all Nunused values from the assistant 38 (a suitable algorithm for which is illustrated in FIG. 3), increments all Cadmitted by Nadmitted, increments all Crejected by Nrejected, then resets all Nadmitted and Nrejected to 0, and sets all Nsharable equal to the sum of Nexess and Nunused. The algorithm then proceeds to Step 2, in which one packet is obtained from the common buffer 28 using FIFO processing, and checked to see if the packet is a TCP connection request. This examination is done by checking whether or not the SYN bit is ON. If the SYN bit is OFF (meaning the packet is not for a TCP connection request, but for an existing TCP connection), Step 2 allows the packet to go through, and the algorithm returns to Step 1. However, if the SYN bit is ON (meaning the packet is a request for a new TCP connection), Step 3 is executed.

Step 3 serves to guarantee the minimum service level agreement Nmin to every customer's application. In Step 3, the index (i,j) of the received packet is determined, and the TCP connection request is admitted if the number of TCP connections admitted (Nadmitted(i,j)) thus far is less than the guaranteed minimum (Nmin(i,j)). In Step 4, TCP connection requests beyond the minimums and up to the maximums are accepted by fairly allocating the "sharable" resources (Nsharable) to all customers. Step 4 accepts a TCP connection request as long as Nsharable(j) is greater than zero. Once Nsharable(j) is reduced to zero as a result of admitted TCP connection requests (Nadmitted(i,j)) beyond the minimums (Nmin(i,j)), the received TCP connection request is forwarded to the guide 34 for further handling.

As noted above, FIG. 3 illustrates an algorithm for the assistant 38 that can be used in conjunction with the real-time gatekeeper algorithm of FIG. 2. The assistant algorithm returns Nunused(j)=0 for every application when the mode of operation is "not borrowable," meaning that a customer is not allowed to use the unused resources of another. When the mode of operation is "borrowable," the algorithm in FIG. 3 computes the total amount of unused resources Nunused(j) for every application, and returns the computed amount to Step 1 of the gatekeeper algorithm of FIG. 2. As such, the WWR 12 allows for "borrowing" and "non-borrowing" of unused TCP connection workload by those that require more TCP connections than their agreed upon minimums. In order to avoid the over-usage of unused resources Nunused(j), a constant multiplier called "Unused_Permit_Factor(j)" is preferably used for every application. The value of this multiplier is between zero and one.

The guide 34 also employs an algorithm that can be used in conjunction with the real-time gatekeeper algorithm of FIG. 2 (as well as an alternative gatekeeper algorithm illustrated in FIG. 4, discussed below). As noted previously, the guide 34 is responsible for deciding what to do with rejected TCP connection requests: either simply drop each rejected TCP connection request (Option 1), or return the packet with the reset (RST) bit "ON" to the initiator of the TCP connection request (Option 2). Since Option 2 triggers the immediate closure of the TCP connection initiation without a TCP connection time-out, Option 2 is "amicable" to end-users.

The method described above is "real-time" since decisions are made for every packet received on a per packet base. The WWR 12 of this invention can be modified to use a "target-rate-based" algorithm, in which the rates at which to admit TCP connection requests are computed on a periodic basis, such as every second. FIG. 4 illustrates a target-rate-based gatekeeper algorithm that can be employed by the gatekeeper 30 in lieu of the algorithm of FIG. 2. Step 1 of FIG. 4 resets variables every time the cycle time has expired. The key in this step is to get target rates Ntarget(i,j) from the assistant 38, whose corresponding target-rate-based algorithm is illustrated in FIG. 5 (discussed below). Step 2 simply admits the received packet when the packet's SYN bit is OFF. Step 3 of FIG. 4 admits the TCP connection request as long as the total number of connection requests admitted Nadmitted(j) is not more than the target rate Ntarget(j) for every application. Otherwise, the TCP connection request is handed over to the guide 34 for further handling.

Figure 4:
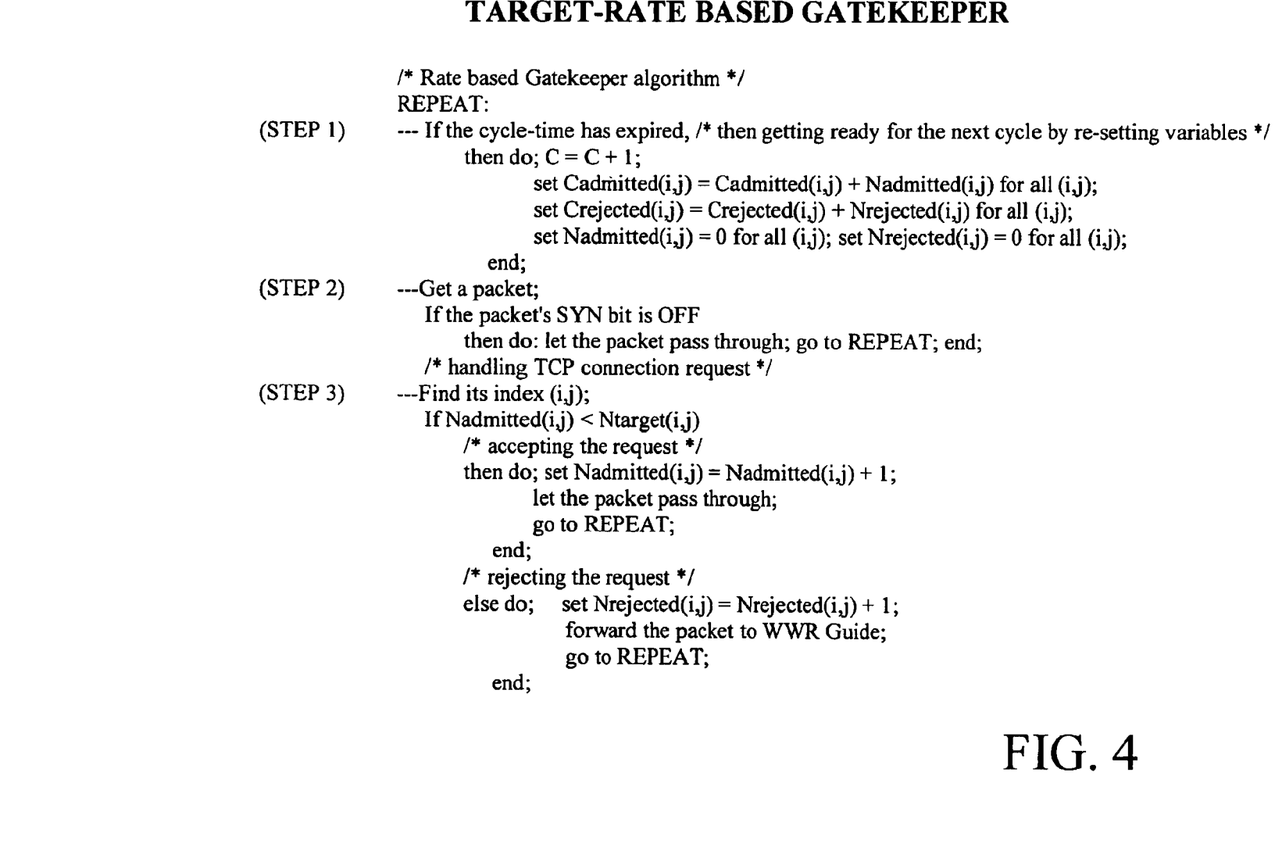
FIG. 4 illustrates a target-rate-based algorithm that can be used in the gatekeeper in place of the real-time algorithm of FIG. 2.
Figure 5:
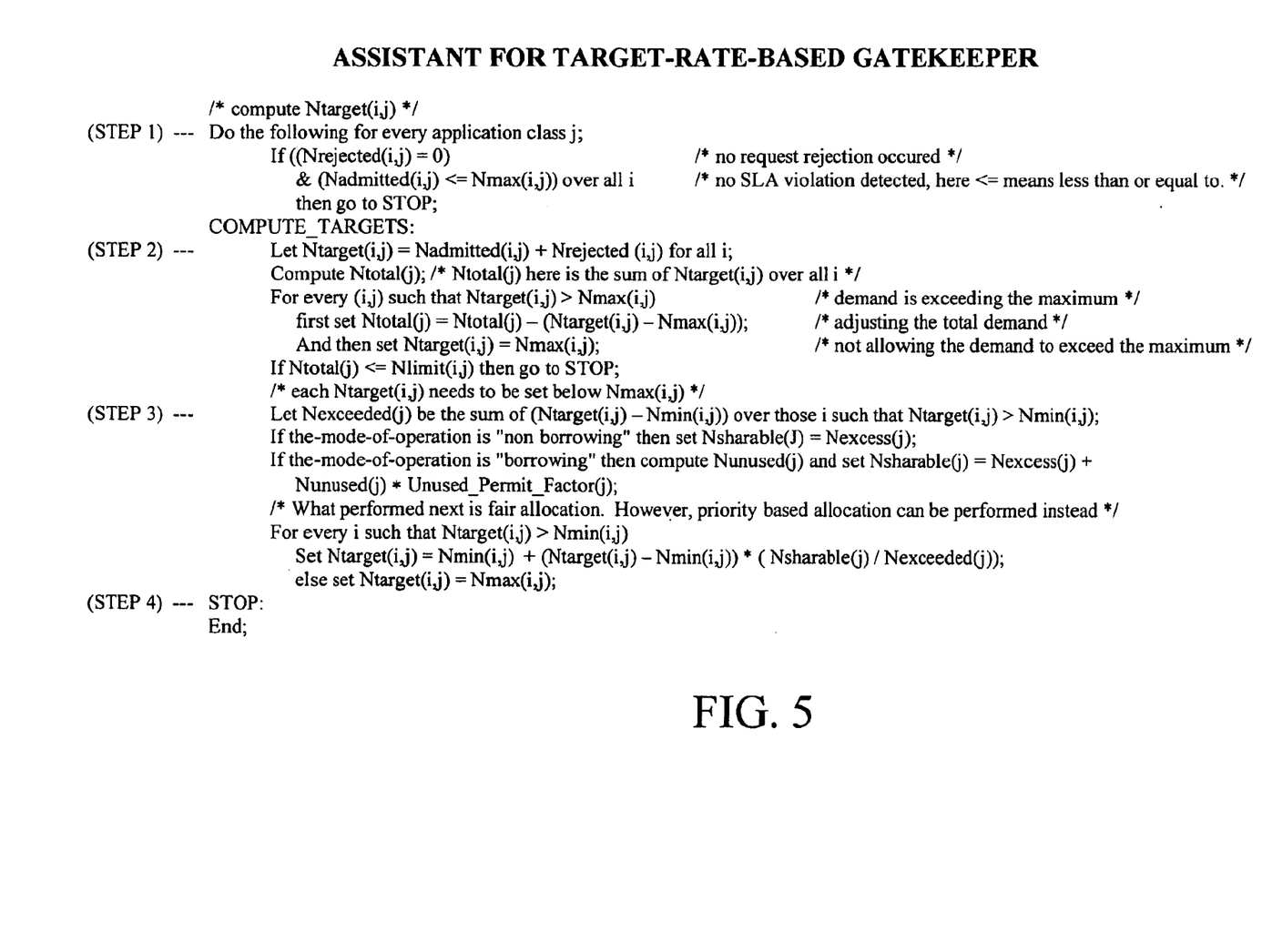
FIG. 5 illustrates an algorithm used in the assistant that operates in conjunction with the target-rate-based gatekeeper algorithm of FIG. 4.

The algorithm illustrated in FIG. 5 for the assistant 28 is specifically intended for use in conjunction with the target-rate-based gatekeeper algorithm illustrated in FIG. 4. The function of the assistant algorithm of FIG. 5 is to compute Ntarget(i,j) for all (i,j) that are used by the target-rate-based gatekeeper of FIG. 4. Step 1 quickly checks whether or not Ntarget(i,j) needs to be re-computed. The recomputation of Ntarget(i,j) is skipped (go to STOP) as long as no TCP connection request has been rejected and no SLA violation has been observed. Step 2 of the assistant algorithm ensures that each Ntarget(i,j) does not exceed Nmax(i,j) for every (i,j). Step 3 computes Nsharable(j) depending on whether the mode-of-operation is "borrowable" or "not borrowable." Step 3 then prorates and allocates Nsharable(j) to those (i,j) whose target rate Ntarget(i,j) demands more than Nmin(i,j). For those (i,j) where Ntarget(i,j) is less than or equal to Nmin(i,j), it resets Ntarget(i,j) equal to Nmax(i,j) (equivalent to not throttling). Finally, Step 4 terminates the assistant algorithm.

With present invention, the WWR 12 operates to guarantee and deliver (minimum, maximum) TCP connection request workload-based SLA's for applications that are serviced by a collection of servers, and does so without receiving any periodic control signals and with minimal intrusion of the external means 40. An important feature of the WWR 12 is that the total workload coming into the server farm 20 is maximized, and yet fair admittance of workload is provided to multiple customers. Along these lines, any single customer's application workload is prevented from monopolizing an entire application processing capacity allocated by an APS to that type of application for all customers. The WWR 12 is also capable of providing differentiated services to a plurality of different applications by assigning different priorities to different applications, by assigning different values to excess capacities Nexess(j), and by assigning different values to Unused_Permit_Factor(j). The manner in which incoming traffic is examined and regulated by the WWR 12 provides the additional benefit of preventing any wrongful user or users trying to crash customer web sites or the server farm by generating extremely high volume of TCP connection requests. Otherwise, the WWR 12 effectively appears as a "wire" to the incoming traffic since its operation is "stateless" (i.e., the WWR 12 does not keep track of individual TCP connections).

The WWR 12 described above can be implemented by hardware, software, or both. For example, the WWR 12 may be implemented by operating a computer, as embodied by a digital data processing apparatus, to execute a sequence of machine-readable instructions. These instructions may reside in various types of programmable signal-bearing media. Thus, this aspect of the present invention is directed to a programmed product, including signal-bearing media tangibly embodying a program of machine-readable instructions executable by a digital data processor to perform the above method. Hence, in addition to the hardware and process environment described above, the present invention provides a computer-implemented method for enforcing TCP connection request-based SLA's to a plurality of customers hosted on a clustered web server, as described above. As an example, this method may be implemented in a particular hardware environment by executing a sequence of machine-readable instructions in the signal-bearing media.

Accordingly, while the invention has been described in terms of specific embodiments, it is apparent that other forms could be adopted by one skilled in the art. Accordingly, the scope of the invention is to be limited only by the following claims.

What is claimed is:

1. A method of regulating admittance of a number of TCP connection requests to a plurality of servers that support to a plurality of applications and a plurality of customers, each of the customers having electronic business activity hosted by the plurality of servers on the basis of a service level agreement that specifies a minimum TCP connection rate that the customer is guaranteed, the method comprising the steps of:

receiving incoming workload for the plurality of customers for the plurality of applications into a common buffer, the incoming workload comprising IP packets associated with existing TCP connections and TCP connection requests;

taking an IP packet from the common buffer;

detecting whether the IP packet taken from the common buffer is a TCP connection request packet or is associated with an existing TCP connection;

immediately sending the IP packet to the servers if the IP packet is associated with an existing TCP connection;

rejecting the IP packet if associated with a TCP connection request unless the IP packet is necessary to meet the minimum TCP connection rate for the customer associated with the TCP connection request or if sending the IP packet to the servers does not prevent meeting the minimum TCP connection rate for another of the customers.

2. The method according to claim 1, wherein all of the incoming workload is received into the common buffer and the TCP connection request packets are processed on a first in, first out basis.

3. The method according to claim 1, wherein the method does not directly control outbound traffic from the plurality of servers.

4. The method according to claim 1, wherein the detecting step is performed by determining whether a SYN bit of the IP packet is ON or OFF.

5. The method according to claim 1, wherein the rejected IP packet is dropped.

6. The method according to claim 1, wherein the rejected IP packet is returned with a reset code bit ON.

7. The method according to claim 1, further comprising the step of calculating whether TCP connection request packets of one or more of the customers can be admitted for one or more of the applications when the one or more customers already exceed the minimum TCP connection rate for the one or more applications.

8. The method according to claim 1, further comprising the step of communicating with an external means to receive revisions to one or more of the service level agreements.

9. The method according to claim 1, further comprising the step of communicating with an external means to send collected statistics data to the external means.

10. The method according to claim 1, wherein the detecting, sending and rejecting steps are performed with a real-time admittance/rejection algorithm wherein the flow of the TCP connection request packets is regulated to the plurality of servers on a per-packet basis.

11. The method according to claim 1, wherein the detecting, sending and rejecting steps are performed with a target-rate-based admittance/rejection algorithm wherein the flow of the TCP connection request packets is regulated to the plurality of servers on a per-unit-time basis.

12. A method of controlling and guaranteeing a service level agreement based on a number of TCP connection requests supported to a plurality of applications and a plurality of customers having electronic business activity hosted by a server farm, each of the customers having a service level agreement that specifies a minimum TCP connection rate that the customer is guaranteed, the method comprising the steps of:

receiving all incoming workload for the plurality of customers for the plurality of applications into a common buffer, the incoming workload comprising IP packets associated with existing TCP connections and TCP connection requests;

taking TCP connection request packets from the common buffer on a first in, first out basis; and controlling flow of the IP packets from the common buffer to the server farm for each application and each customer so as to provide at least the minimum TCP connection rate for each customer and each application by regulating flow of the TCP connection request packets to the server farm, the controlling step comprising:

detecting whether an IP packet is a TCP connection request packet or associated with an existing TCP connection;

immediately admitting IP packets associated with existing TCP connections;

admitting TCP connection request packets if necessary to meet the minimum TCP connection rate for the customer associated with the TCP connection request; and admitting a TCP connection request packet of one of the customers if doing so does not prevent meeting the minimum TCP connection rate for another of the plurality of customers.

13. The method according to claim 12, wherein the method does not directly control outbound traffic from the serve farm.

14. The method according to claim 12, wherein the detecting step is performed by determining whether a SYN bit of the IP packet is ON or OFF.

15. The method according to claim 12, further comprising the step of dropping IP packets that are not admitted during the controlling step.

16. The method according to claim 12, further comprising the step of returning TCP connection request packets that are not admitted during the controlling step, the IP packets not admitted during the controlling step being returned with a reset code bit ON.

17. The method according to claim 12, further comprising the step of calculating whether a TCP connection request packet of one or more of the customers can be admitted for one or more of the applications when the one or more customers already exceed the minimum TCP connection rate for the one or more applications.

18. The method according to claim 12, further comprising the step of communicating with an external means to receive revisions to one or more of the service level agreements, and to send collected statistics data to the external means.

19. The method according to claim 12, wherein the controlling step is performed with a real-time admittance/rejection algorithm wherein the flow of the TCP connection request packets is regulated to the server farm on a per-packet basis.

20. The method according to claim 12, wherein the controlling step is performed with a target-rate-based admittance/rejection algorithm wherein the flow of the TCP connection request packets is regulated to the server farm on a per-unit-time basis.

21. A system for regulating admittance of a number of TCP connection requests to a plurality of servers that support to a plurality of applications and a plurality of customers, each of the customers having electronic business activity hosted by the plurality of servers on the basis of a service level agreement that specifies a minimum TCP connection rate that the customer is guaranteed, the system comprising:

a common buffer for receiving incoming workload for the plurality of customers for the plurality of applications, the incoming workload comprising IP packets associated with existing TCP connections and TCP connection requests; and regulator means for taking an IP packet from the common buffer, detecting whether the IP packet is a TCP connection request packet or is associated with an existing TCP connection, immediately sending the IP packet to the servers if the IP packet is associated with an existing TCP connection, and reiecting the IP packet if associated with a TCP connection request unless the IP packet is necessary to meet the minimum TCP connection rate for the customer associated with the TCP connection request or if sending the IP packet to the servers does not prevent meeting the minimum TCP connection rate for another of the customer.

22. The system according to claim 21, wherein the common buffer is configured to receive all of the incoming workload, and the controlling means is configured to process the TCP connection request packets on a first in, first out basis.

23. The system according to claim 21, wherein the system is not configured to directly control outbound traffic from the plurality of servers.

24. The system according to claim 21, wherein the regulator means is configured to determine whether a SYN bit of an IP packet is ON or OFF.

25. The system according to claim 21, wherein the regulator means further comprises means for dropping rejected IP packets.

26. The system according to claim 21, wherein the regulator means further comprises means for returning rejected IP packet with a reset code bit ON.

27. The system according to claim 21, further comprising means for calculating whether TCP connection request packets of one or more of the customers can be admitted for one or more of the applications when the one or more customers already exceed the minimum TCP connection rate for the one or more applications.

28. The system according to claim 21, further comprising means for communicating with an external means to receive revisions to one or more of the service level agreements.

29. The system according to claim 21, further comprising means for communicating with an external means to send collected statistics data to the external means.

30. The system according to claim 21, wherein the regulator means operates with a real-time admittance/rejection algorithm wherein the flow of the TCP connection request packets is regulated to the plurality of servers on a per-packet basis.

31. The system according to claim 21, wherein the regulator means operates with a target-rate-based admittance/rejection algorithm wherein the flow of the TCP connection request packets is regulated to the plurality of servers on a per-unit-time basis.

32. A system of controlling and guaranteeing a service level agreement based on a number of TCP connection requests supported to a plurality of applications and a plurality of customers having electronic business activity hosted by a server farm, each of the customers having a service level agreement that specifies a minimum TCP connection rate that the customer is guaranteed, the system comprising:

a common buffer into which is received all incoming workload for the plurality of customers for the plurality of applications, the incoming workload comprising IP packets associated with existing TCP connections and TCP connection requests;

a gatekeeper that takes the IP packets from the common buffer on a first in, first out basis and controls flow of the IP packets from the common buffer to the server farm for each application and each customer so as to provide at least the minimum TCP connection rate for each customer and each application by regulating flow of the IP packets to the server farm, the gatekeeper being operable to detect whether an IP packet is a TCP connection request packet or associated with an existing TCP connection, immediately admit IP packets associated with existing TCP connections, admit a TCP connection request packet if necessary to meet the minimum TCP connection rate for the customer associated with the TCP connection request, and admit a TCP connection request packet of one of the customers if doing so does not prevent meeting the minimum TCP connection rate for another of the plurality of customers.

33. The system according to claim 32, wherein the system does not directly control outbound traffic from the serve farm.

34. The system according to claim 32, wherein the gatekeeper is configured to determine whether a SYN bit of the IP packet is ON or OFF.

35. The system according to claim 32, further comprising a guide means for dropping TCP connection request packets that are not admitted by the gatekeeper.

36. The system according to claim 32, further comprising a guide means for returning TCP connection request packets that are not admitted with a reset code bit ON.

37. The system according to claim 32, further comprising an assistant means for calculating whether TCP connection request packets of one or more of the customers can be admitted for one or more of the applications when the one or more customers already exceed the minimum TCP connection rate for the one or more applications.

38. The system according to claim 32, further comprising a manager means for communicating with an external means to receive revisions to one or more of the service level agreements, and to send collected statistics data to the external means.

39. The system according to claim 32, wherein the gatekeeper operates with a real-time admittance/rejection algorithm wherein the flow of the TCP connection request packets is regulated to the server farm on a per-packet basis.

40. The system according to claim 32, wherein the gatekeeper operates with a target-rate-based admittance/rejection algorithm wherein the flow of the TCP connection request packets is regulated to the server farm on a per-unit-time basis.

\* \* \* \* \*